United States Patent
Grimshaw et al.

[11] Patent Number: 5,352,306
[45] Date of Patent: Oct. 4, 1994

[54] TAPE LAYING APPARATUS AND METHOD

[75] Inventors: Michael N. Grimshaw; David A. Peterson, both of Milford, Ohio

[73] Assignee: Cincinnati Milacron Inc., Cincinnati, Ohio

[21] Appl. No.: 68,011

[22] Filed: May 27, 1993

[51] Int. Cl.$^5$ .............................................. B32B 31/00
[52] U.S. Cl. ................................. 156/64; 156/189; 156/361; 156/363; 156/523; 156/574
[58] Field of Search ................ 156/64, 189, 191, 192, 156/361, 363, 425, 433, 523, 574

[56] References Cited

U.S. PATENT DOCUMENTS

| | | | |
|---|---|---|---|
| 4,557,783 | 12/1985 | Grone et al. | 156/257 |
| 4,750,965 | 6/1988 | Pippel et al. | 156/361 |
| 4,954,204 | 9/1990 | Grimshaw | 156/361 |
| 4,997,508 | 3/1991 | Shinno et al. | 156/351 |
| 4,997,510 | 3/1991 | Shinno et al. | 156/361 |
| 5,011,563 | 4/1991 | Shinno et al. | 156/523 X |
| 5,074,948 | 12/1991 | Greffioz et al. | 156/523 X |

FOREIGN PATENT DOCUMENTS 2529871  1/1984  France ........................ 156/361

Primary Examiner—Mark Osele
Attorney, Agent, or Firm—Thomas M. Farrell; Donald Dunn

[57] ABSTRACT

An improved tape laying machine, more particularly an improved tape laying head assembly is provided for laying plastic tape onto a work surface to produce a reinforced plastic structure. The improvement provides means for transferring the vertical movement of at least one segment of a stacked plate segmented shoe presser member, of the head assembly, as it engages the work surface to a non-terminal segment of the stacked plate segmented shoe and a sensor means, e.g. a linear variable differential transformer, sensing the movement of the non-terminal segment to produce a signal related to the movement of the non-terminal segment that can be employed to control and direct the movement of the head assembly and/or presser member. The improvement of the invention produces a smooth shimless transition of the presser member onto the work surface, from a work surface non-engaging position, in a tape laying operation.

9 Claims, 8 Drawing Sheets

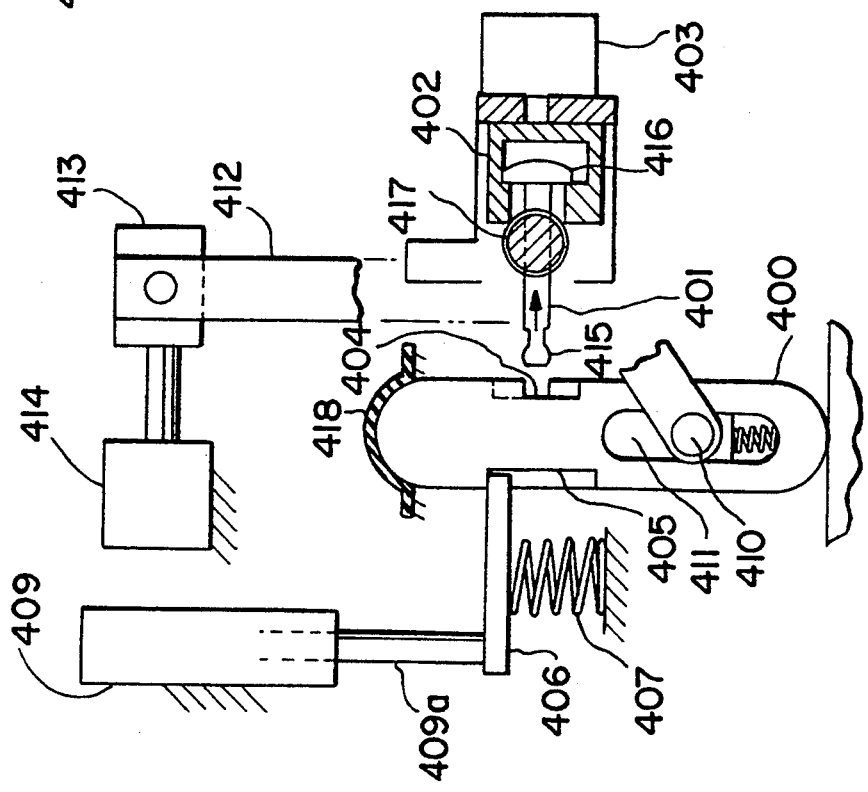

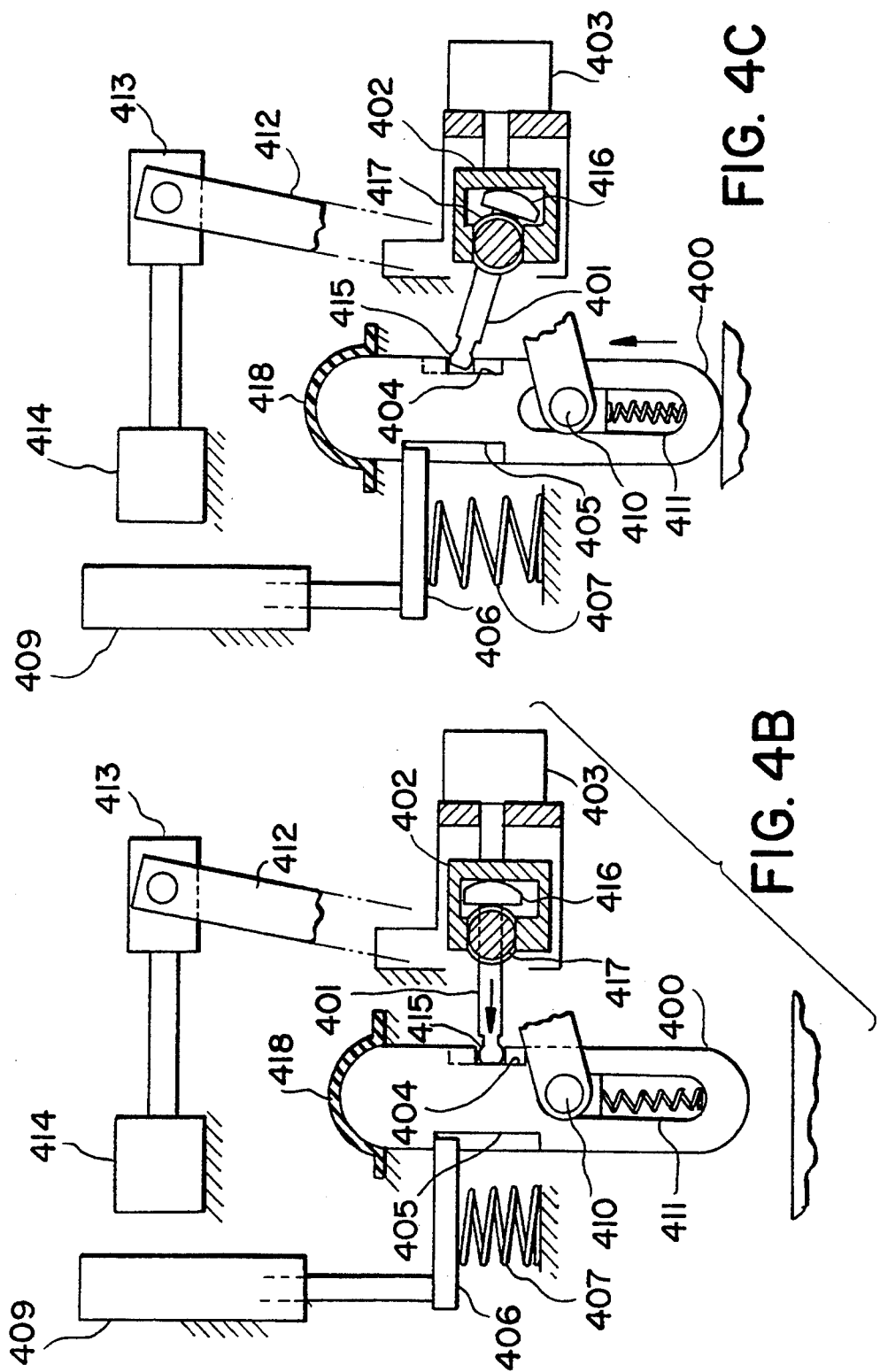

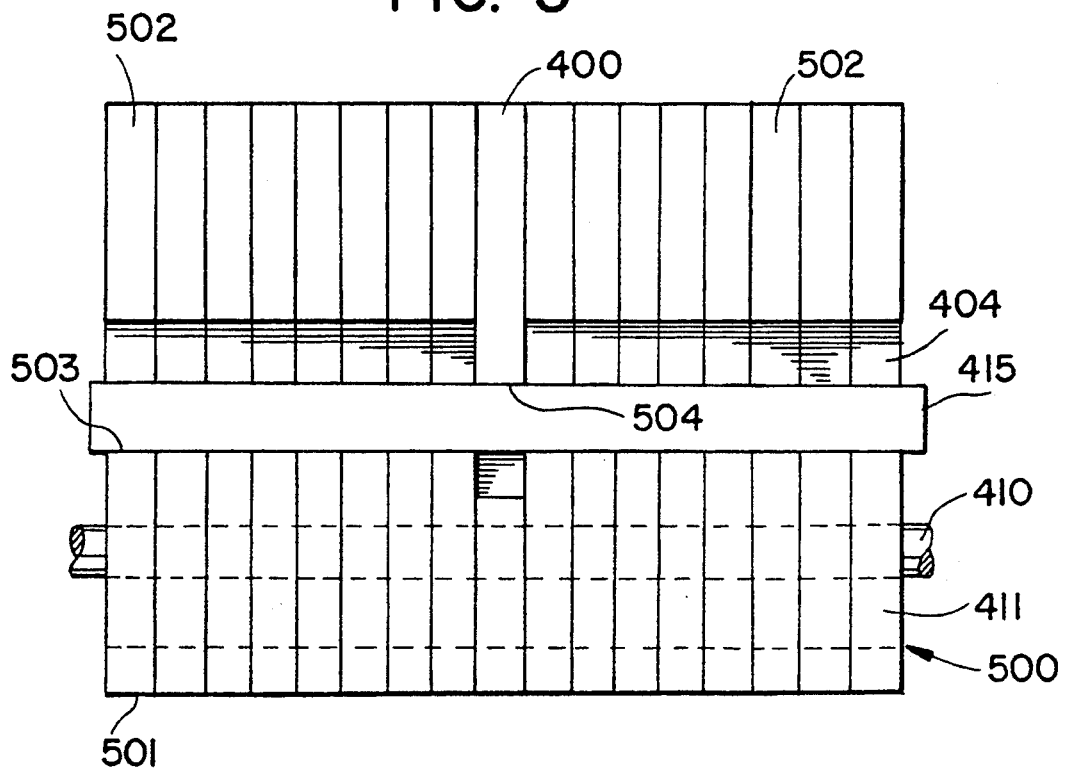
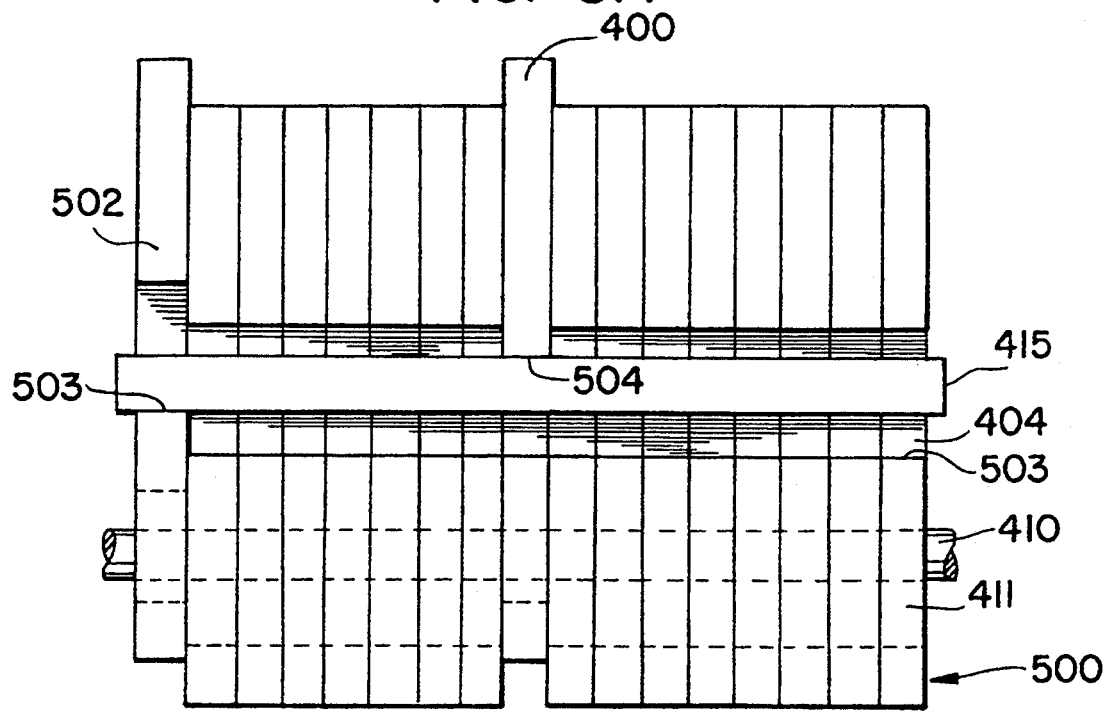

TAPE LAYING APPARATUS AND METHOD

FIELD OF INVENTION

This invention relates generally to machines for laying plastic tape, particularly fiber reinforced composite plastic tape, to create reinforced composite plastic structures. Such machines generally employ a presser member, such as a roller or skidding shoe, to apply and compress laminar plys of the plastic tape onto a work surface, particularly a contoured work surface.

BACKGROUND OF THE INVENTION

Tape laying machines are well known in the art for making various composite plastic structures including components for aircraft, components for automobiles and part for ships. These machines have a tape laying head, usually oriented around a tape laying path, that includes a presser member for applying force against the tape to detrude the tape onto the work surface while following the changing contour of the work surface (e.g. mold). Such a tape machine is described in U.S. Pat Nos. 4,557,783 and 4,954,204, assigned to the assignee of this application, the entire disclosures of which are incorporated herein by reference. U.S. Pat. No. 4,954,204 more specifically describes a presser member employing a segmented shoe.

The tape is customarily a thermosetting or thermoplastic film often having fibrous (e.g. glass or carbon fibers) reinforcement embedded therein. Such tape is applied to the work surface by a presser member with some amount of pressure or force, in layers that are subsequently further consolidated, often with heat and pressure.

More recent designs of tape laying machines, for making composite plastic structures, employ a segmented shoe in the presser member. The segmented shoe customarily has a plurality of individually movable parallel plates or individually movable rollers which provide the advantage of improved conformation of the tape to the work surface, especially when simultaneous multiaxial changes in contour occur on the work surface. To further improved the performance of the segmented shoe it is known to use a flexible skid member (e.g. a sheet of tough flexible material) between the shoe (i.e. the shoe segments) and the tape. This flexible skid can allow easier movement of the shoe over the tape.

In the laying of the plastic tape onto the work surface or a previously laid layer of tape the tape laying machines start with the head and more particularly the presser member at some initial location near but off of the desired contact point with the work surface or previously laid layer of tape. However the exact position of the contact point with the work surface, especially the exact vertical axis position of the work surface with respect to the tape laying head, is not known with sufficient accuracy and/or may vary such that stopping the downward movement of the head at the proper time the presser member engages the work surface is often very difficult to achieve. From the initial location the head and more particularly the segmented shoe presser member, with all the segments of the shoe brought to the same position in the shoe known as the null position, is brought to the edge or other predetermined position of the work surface or previously laid layer of tape by the machine controls manually or under the direction of a computer program. As the segmented shoe engages the work surface, in an approach that has the longitudinal axis of the segmented shoe at some angle to the edge of the work surface, the head and its presser member move vertically and laterally with respect to the work surface and pressure is applied to the shoe segments for compacting the tape onto the work surface. When one or more segments of the shoe engage the edge of the work surface they are raised leaving the other non-engaging segments down with respect to both the engaging segments and the work surface. This condition causes the tape, which is lying across the width of the segmented shoe, to become distorted (i.e. twisted) with the downward movement of the head before such movement of the head is stopped. To overcome this problem the prior art has employed manual adjustment of the downward movement of the head, including the presser member and/or a shim to provide a resting surface for the segments of the shoe that do not initially engage the work surface, so that all of the segments are positioned at the same vertical location as those initially engaging the work surface as the shoe proceeds on to the work surface laying tape.

Since the shim is located at the edge of the work surface where the shoe is to engage the work surface the position of the shim and the work surface edge may be included in a computer program to control the movement of the tape laying machine head for engaging the work surface and laying tape. However this system requires a shim to be positioned at each place where the presser member of the head engages the work surface to lay down a course of tape thus adding to the complexity of the tape laying machine and process. Additionally it is not always appropriate, desirable or possible to employ a shim or manual control of the head movement for engaging the work surface, particularly with a segmented shoe presser member. Thus a more effective, accurate, efficient and automated apparatus and method for bringing a segmented shoe into engagement with a work surface, from a non-engaging location, for laying plastic tape thereon is both needed and desirable.

BRIEF DESCRIPTION OF THE DRAWINGS

FIGS. 4, 4a, 4b and 4c are schematic views of component positions in a presser member of the tape laying machine of this invention.

FIG. 5 is a schematic view of the segments of a segmented shoe of a presser member in accordance with the invention, in a null position with the high segment bar engaging the segments.

FIG. 5a is a schematic view of the segments of a segmented shoe of a presser member in accordance with the invention upon contacting a work surface.

SUMMARY OF THE INVENTION

Figure 1:
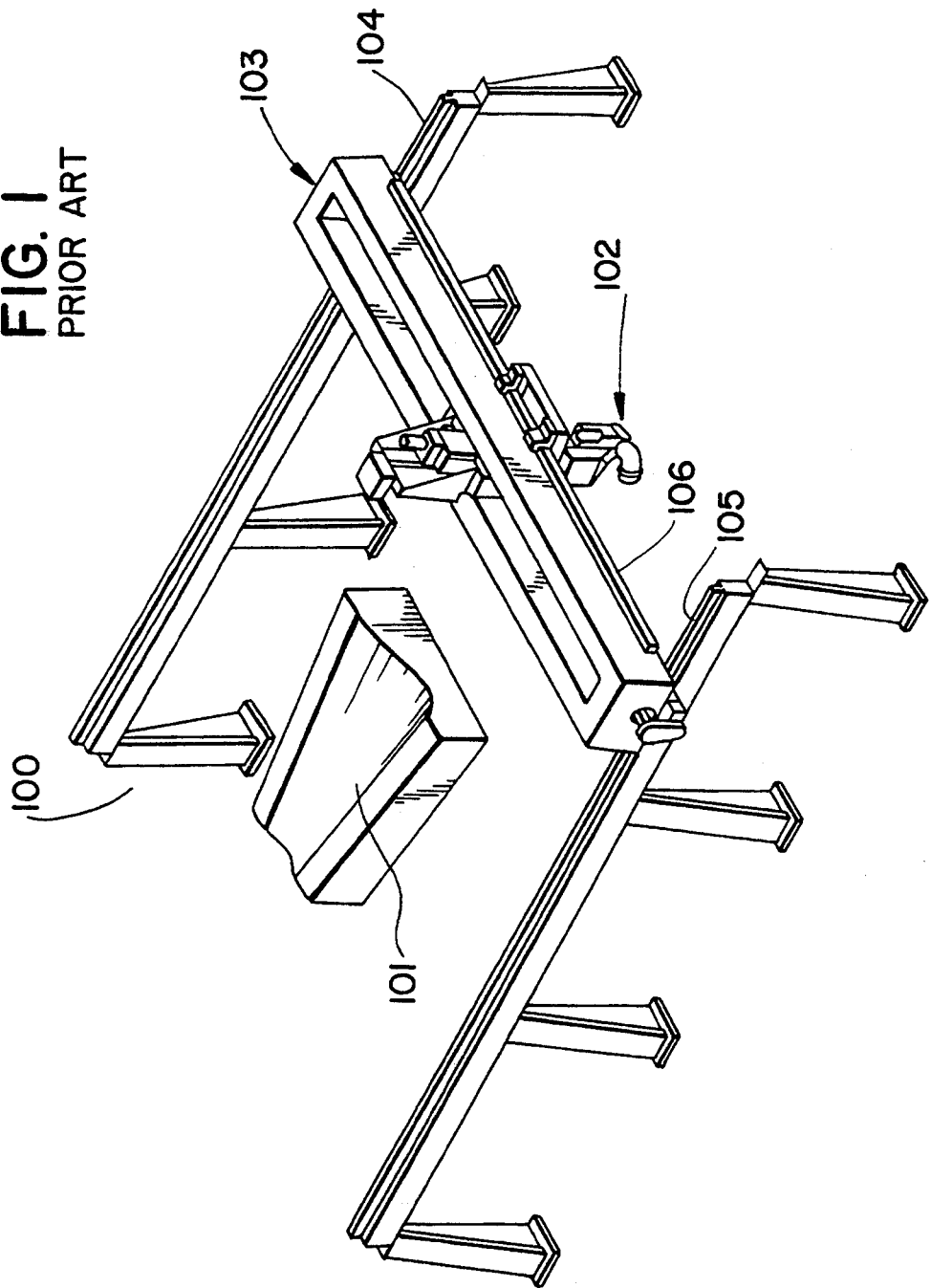
FIG. 1 is a perspective view of a tape laying machine showing a gantry structure and a work surface or mold.

It is an object of this invention to provide an improved apparatus for laying plastic tape that has increased accuracy and control for engaging the work surface upon which plastic tape is to be laid.

It is another object of this invention to provide an improved presser member for a plastic tape laying apparatus that senses and controls the engagement of a segmented shoe presser member with the work surface upon which plastic tape is to be laid.

It is a further object of this invention to provide an improved tape laying head and segmented shoe presser member having a position transferring element to transfer the movement of a non-central segment of the segmented shoe to the center segment of the segmented shoe so as to move the center segment and a sensor means sensing the movement of the center segment.

These and other objects, as will be made known from the following description and claims, are achieved by this invention embodied in an improved tape laying machine for laying fibrous reinforced plastic tape onto a work surface, for example a mold, where the machine has an improved head movable on a base frame in response to means for controlling the movement of the head along plural axis with respect to the work surface, wherein the improved head comprises:

1) head frame;
2) a presser member fixable to said head free, the member comprising a housing and a plurality of parallel arrayed stacked plate segments vertically movable in said housing;
3) means for transferring vertical movement of at least one of said segments to a single non-terminal segment of the stacked plate segments to produce vertical movement of the single non-terminal segment;
4) means for sensing vertical movement of the single non-terminal segment and producing a signal in relation to said movement.

DESCRIPTION OF THE PREFERRED EMBODIMENT

This invention provides an improved tape laying machine or apparatus and a method for producing reinforced composite plastic structures. The machine basically comprises a frame structure, a head assembly that is mounted on the frame structure for movement in a plurality of axes with respect to a work surface upon which the plastic tape is laid to create a composite plastic structure, components for producing movement of the head assembly and controls for directing and controlling the movements of the head assembly. The head assembly, in turn, basically comprises a head frame, a stacked segmented shoe member, a plastic tape storage roll, a carrier take up roll, tape cutting component and optionally a heater assembly for heating the plastic tape prior to the tape being detruded onto the work surface. In accordance with the machine of this invention the improvement lies in the head assembly and more especially in the stacked segmented shoe presser member of the assembly, wherein there is provided a motion transferring means for transferring the vertical, more especially the upward, movement of at least one segment of the plurality of vertically moveable parallel arranged plate type segments of the segmented shoe to a single non-terminal segment to produce a corresponding vertical, more especially upward, movement of the single non-terminal segment and a sensing means to detect the movement of the single non-terminal segment and produce a signal in relation to that movement that is then usable to control the movement of the head assembly and/or the presser member of the head assembly. A tape laying machine, head assembly, presser member and segmented shoe particularly adaptable for improvement in accordance with this invention is described in U.S. Pat. No. 4,954,204, assigned to Cincinnati Milacron Inc., the entire disclosure of which is incorporated herein by reference.

In FIG. 1 there is depicted a high rail gantry type tape laying machine 100 positioned around a contoured mold 101 which comprises a multi axis positionable tape laying head 102 that is supported on gantry 103 and is transported coordinately on side rails 104 and 105 and gantry rail 106 for laying down plastic tape on the contoured surface of mold 101 to form a composite structure.

Figure 2:
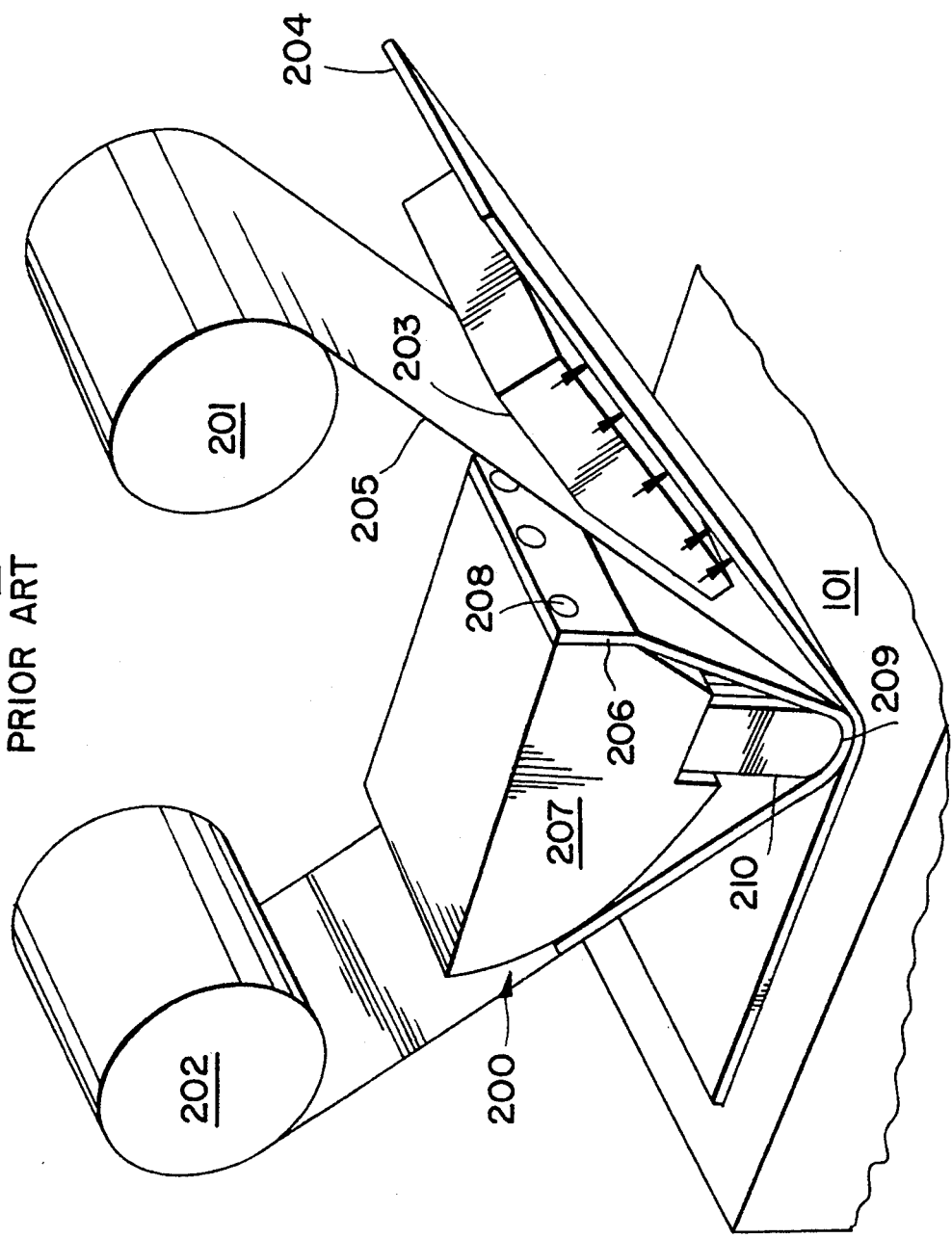
FIG. 2 is a perspective view of a prior art presser member of a tape laying machine with associated tape source supply and backing carrier take up rolls and a tape heater.

The perspective view in FIG. 2 illustrates a prior art presser member 200 along with associated paper backing supply roll 201, paper backing take up roll 202 heater 203 and mold 101 especially adapted for laying up thermoplastic plastic tape 204. The plastic tape 204 is passed under heater 203 to soften the tape for detruding onto the contoured surface of mold 101. After passing under heater 203 tape 204 is joined with paper 205 from supply roll 201 and passed under flexible skid member 206, fixed at one end to housing 207 of presser member 200 by screws 208. Flexible skid member 206, paper 205 and plastic tape 204 pass beneath and engage the bottom edge or nose 209 of segmented shoe plate stack 210 supported in housing 207 for detrusion of plastic tape 204 onto the contoured surface of mold 101 to form a composite structure.

Figure 3:
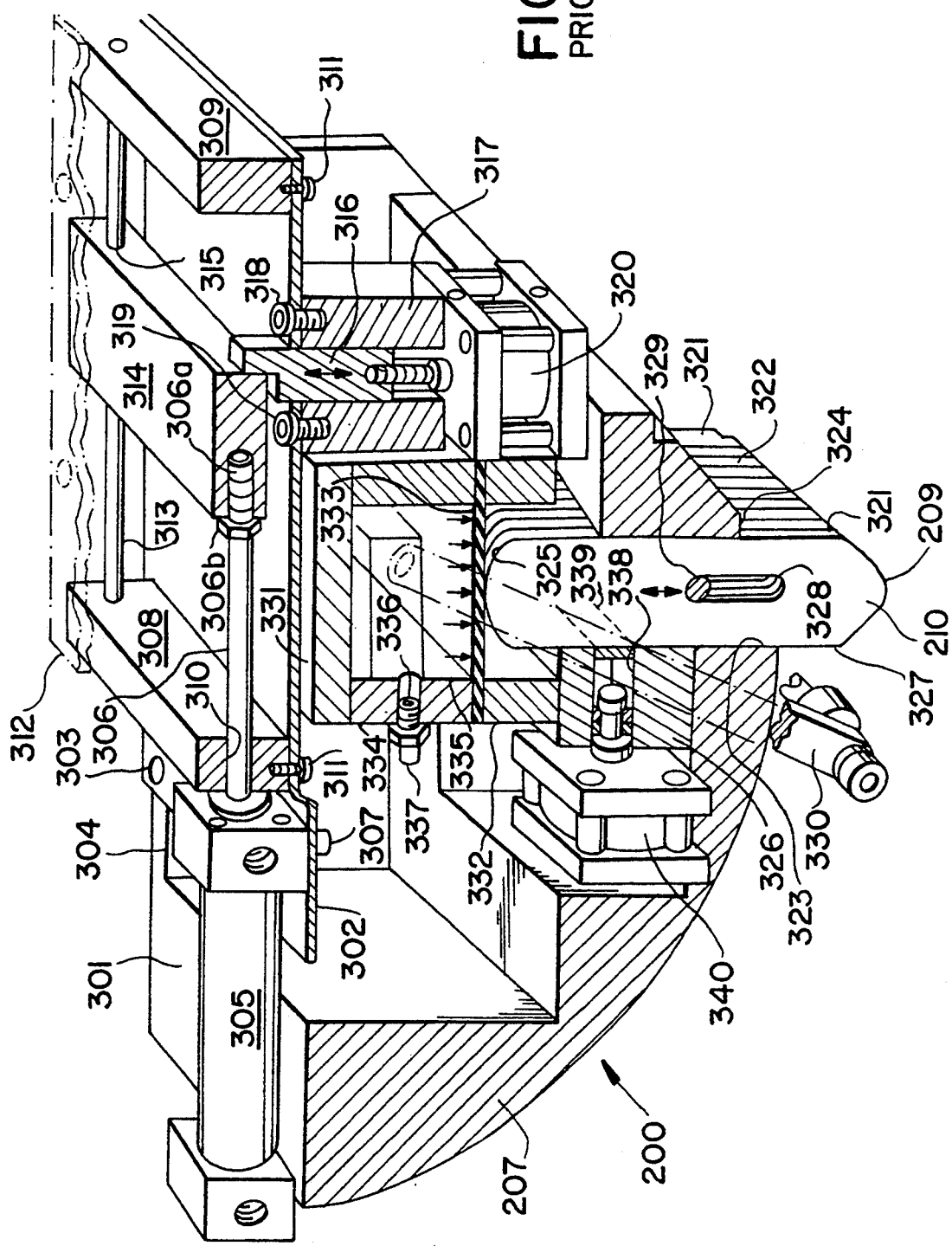
FIG. 3 is a perspective view in section of a prior art presser member.

FIG. 3 shows a perspective view in section the presser member 200 of FIG. 2 to move particularly point out the structure of presser member 200 without the associated rolls 201 and 202, heater 203 and flexible skid 206. The housing 207 is quarter rounded at its lower rear surface and has a top surface 301 to which flat housing plate 302 is bolted by screws 303. The housing plate 302 spans the main opening 304 and serves as a mounting for centrally located air cylinder 305 having a single piston rod 306 extending forwardly. Cylinder 305 is secured to the top plate 302 by several screws 307. Immediately adjacent the front of cylinder 305 is a first guide block 308 extending across the width of the plate 302 and housing 207 and a similar second guide block 309 is located at the front end of the plate 302, the difference in the two blocks 308 and 309 being that the first block 308 has a clearance hole 310 for piston rod 306. The blocks 308 and 309 are held to plate 302 by a plurality of screws 311 extending from underneath and a mounting plate 312 is, in turn, secured to the upper surface of blocks 308, 309. The mounting plate 362 serves as a mounting member for fastening the assembled presser member 200 to a main frame, not shown. Guide blocks 308, 309 have a pair of parallel guide rods 313 extending there between, one on each side of the assembly and a horizontal slider 314 rides with bushings 315 on guide rod 313. The threaded end 306a of piston rod 306 is received in slider 314 and is affixed thereto by jam nut 306b.

The slider 314 has three specific positions:
1) fully retracted, i.e. residing against the first guide block 308 as the piston rod 306 is fully retracted into cylinder 305, 2) forwardly advanced against latch finger 316 and
3) fully advanced against the second guide block 309 (as the latch finger 316 is retracted).

The latch finger 316 slides in a vertical guide block 317 which is secured by screws 318 to the lower surface of the housing plate 302. The latch finger 316 extends through an aperture 319 in the plate 302 and is powered in the vertical direction by a compact fluid cylinder unit 320, secured to the bottom of guide block 317.

Shoe plate stack 210 is comprised of a plurality of parallel-faced, wafer-like shoe plates 321, 322 stacked in parallel array across the tape width and guided in slot 323 in the lower surface 324 of the housing 207. Shoe plates 321, 322 have a convex top edge 325 and a rounded bottom work piece presser edge or nose 209. The two outer shoe plates 321 are twice as thick as the inner shoe plates 322 to provide side stiffness, but the outer shoe plates 321 are thinned-down at their bottom edge 209 to the same thickness as the inner shoe plates 322. The shoe plates 321, 322 are backed up by a brake block 326, situated in the housing 207, which serves as an additional guide for their rear edges 327, the brake block 326 being in line with the slot 323 in the housing 207. A vertical elongate slot 328, of common size, is in line through all the plates 321, 322 and a control rod 329 extends horizontally, from side to side, through all the slots 328. The control rod 329 is connected to a link 330 at each of the outer ends and the top of the links 330 are pivotally connected to the opposite side edges of the slider 314. In the position shown in FIG. 5 i.e. with the slider 314 stopped against the latch finger 316, the upper edges of the slots 328 will rest on the control rod 329 and the bottom edges 209 of the plates 321, 322 will be in line as is shown. This position is an alignment, or "null", position where the bottom edges 209 of the plates 321, 322 may thus be programmed in a known relation to the machine, in anticipation of a tape laying move.

In order to provide a downward biasing force to all of the plates 321, 322 a bladder spring 331 is employed comprising an open box frame 332, having a clearance around the periphery of the shoe plates 321, 322. A bifurcated lower portion, not shown, of the box frame 332 extends downward around control rod 329 to act as a guide for control rod 329 and provide guidance for the overall width of the stack shoe plates 321, 322. The box frame 332 has a flexible membrane 333 extending across its entire upper surface, in contact with and spanning the top edge 325 or biasing portion of the plates 321, 322. The membrane 333 is secured in place by a fabricated box 334, which is fully enclosed except for a single open side, which is placed against the membrane 333. The box 334 is secured in assemble with membrane 333, box frame 332 and housing 207 by screws, not shown, so that a closed chamber 335 is formed immediately above membrane 333. The box 334 is provided with an orifice 336 and a fluid coupling 337, mounted therein, so that air or other fluid medium may be introduced into the chamber 335 and, thus, the membrane 333 pressurized to provide a downward biasing force to the entire stack of plates 321, 322. The membrane 333 is yieldable to accommodate surface contour variances which will cause plates 321, 322 to shift vertically, relative to one another, as the tape is laid.

It may be desired at certain instances to lock the plates 321, 322 of the shoe plate stack 210 in a particular contoured state, inhibiting further relative vertical movement between the plates 321, 322. For such instances the brake block 326 has a slot 338 machined across its face adjacent the shoe plates 321, 322. A friction bar or brake pad 339, extends in the slot 338 across the rear edges 327 of the shoe plates 321, 322 and is activated by a compact fluid cylinder 340 which moves the brake pad 339 between "on" and "off" positions. The brake may be useful when the presser member 200 is operating near the edge of a mold and all the plates 321, 322 are not supported by a mold surface beneath the tape. In such instances the tape may be pushed over the edge of the mold in an unwanted fashion if shoe plates 321, 322 are not arrested. The presser member 200 embodied in FIG. 3 may be provided with a flexible skid member 206, not shown, that is fixed at one end to the housing 207 and extends beneath nose 209 of the full width of the shoe plate stack 210 such that nose 209 engages the flexible skid member 206 and in turn the plastic tape or the carrier to which the plastic tape may be temporarily affixed rides against the flexible skid member as is known in the art. Additionally presser member may be provided with a tail compactor, not shown, of a type described in U.S. Pat. No. 4,557,783, assigned to Cincinnati Milacron Inc., for compacting the tail end of a tape course.

In accordance with one embodiment of this invention the presser member 200 of FIG. 3 may be modified to include several elements which sense, adjust and control the motions of shoe plates 321, 322 and the head 102 of the tape laying machine 100. These elements are schematically represented in FIGS. 4, 4a, 4b and 4c, with particular relation to a non-terminal shoe plate 400, by the high segment bar 401, clevis 402, fluid cylinder 403, slot 404, notch 405, arm 406, spring 407, and linear variable differential transformer (LVDT) 409. In FIG. 4 shoe plate 400 is shown in a position that is not a "null" position with control rod 410 residing at a location between the upper and lower ends of slot 411. A control rod arm 412, for vertically moving control rod 410 is pivotally attached at one end to control rod 410 and at the other end pivotally attached to slider 413, which is in turn attached to the piston of fluid cylinder 414. High segment bar 401 has a curved nose end 415 that engages slot 404 in shoe plate 400 and a curved rear end 416 movable positioned in clevis 402 connected to fluid cylinder 403. High segment bar 401 moves latterly to cause the curved nose end 415 pf high segment bar 401 to engage or disengage slot 404 and can vertically pivot about the joint 417. A downward bias is placed on shoe plate 400 by air pressure acting on the flexible membrane 418 of a bladder spring, not shown. A LVDT arm 406 engages notch 405 in shoe plate 400 and is engaged by spring 407 to provide an upward bias force against arm 406 to keep arm 406 in contact with the upper end of slot 405. Arm 406 is in turn connected to LVDT 409.

It is to be recognized that shoe plate 400 is one of a plurality of shoe plates forming a shoe plate stack as shown at 210 in FIG. 3 and that slots 404 and 411, as well as the curved nose end 415 of high segment bar 401, control rod 410 and flexible membrane 418 extend across the entire shoe plate stack. As used in accordance with the invention described and claimed herein the terms segment and shoe plate may be used interchangeably and mean the same thing. Thus the term high segment bar not only denotes an element of the presser member, in accordance with this invention, but also may be descriptive of its function during the operation of the improved tape laying machine of this invention, as will be more fully described below, in that the high segment bar engaging a slot in the shoe plate stack, of the presser member, responds to the upward movement of any segment of the shoe plate stack, except the segment coupled to an LVDT or other signal producing sensing device, when the shoe plate stack first contacts the work surface, upon which the tape will be laid, and transfers the motion of the segment first contacting the work surface to a non-terminal segment coupled to a LVDT or other sensing device. The non-terminal segment is upwardly displaced and this upward motion is detected by the LVDT of other sensing device coupled to the non-terminal segment to produce a signal that is used to control the movement of the tape laying head and/or the presser member of the tape laying head of the improved tape laying machine in accordance with this invention.

At the beginning of the laying of a course of tape the tape laying head is off of the work surface and the presser member, in accordance with this invention, is basically in a condition schematically depicted in FIG. 4. The movements of various elements of a presser member, in accordance with this invention, as the presser member is brought to and first contacts the work surface are schematically represented in FIGS. 4a, 4b and 4c. In FIG. 4a the high segment bar 401 is disengaged from slot 404 as in the case of FIG. 4. Air is supplied to fluid cylinder 414 to move slider 413 to the right causing control rod arm 412 to raise control rod 410 in slot 411. Control rod 410 upon engaging the upper end of slot 411 raises segment 400 and the other segments of the shoe pate stack, not shown to an aligned "null" position. This position is sensed by the LVDT 409, coupled via arm 406 to the non-terminal segment 400, to provide the appropriate signal relating to the "null" condition. Air pressure is then applied to fluid cylinder 403 causing clevis 402 to move to engage the curved end 416 of high segment bar 401 forcing the curved nose end 415 of high segment bar 401 to contact the upper surface of slot 404 in shoe plate or segment 400, as shown in FIG. 4b. At this point it is to be noted, as will be more fully described below, that the slot 404 extending through the entire shoe plate stack is constructed to have the upper surface of the slot 404 only in the non-terminal segment or other sensor coupled segment (e.g. segment 400) engage the curved nose end 415 of high segment bar 401 and only the lower or bottom surface of slot 404 in all the other segments of the shoe plate stack engage the curved nose end 415 of high segment bar 401 when high segment bar 401 is advanced into slot 404.

As the head of the tape laying machine and consequently the segmented shoe presser member of the head contacts the work surface (e.g. mold) upon which the tape is to be laid one or more segments of the shoe plate stack of the segmented shoe presser member is raised from the "null" position. This movement causes the bottom surface of slot 404 in these segments, which is in contact with the curved nose end 415 of high segment bar 401, to lift the curved nose end 415 of high segment bar thus vertically pivoting high segment bar 401 about pivot joint 417 and at the same time causing the curved nose end 415 of high segment bar 401, contacting the upper surface of slot 404 in the non-terminal segment 400, to raise segment 400 as shown in FIG. 4c. The upward movement of segment 400 is followed by arm 406, held in engagement with the upper surface of notch 405 in segment 400 by spring 407, and in turn the motion of arm 406 is relayed to LVDT 409 through an LVDT core rod 409a connected to arm 406. LVDT 409 produces a signal (e.g. electrical output), in relation to the upward motion of segment 400, that is used to control the movement of the head and/or presser member of the improved tape laying machine in accordance with this invention so as to adjust the position of the head and/or presser member relative to the work surface and thereby achieve a smooth, controlled transition of the presser member onto the work surface and a smooth initiation of the laying of a course of tape on the work surface.

The condition represented schematically in FIG. 4c is more fully understood for the shoe plate stack and the curved nose end 415 of high segment bar 401 from the schematic diagram in FIG. 5. In FIG. 5 the shoe plate stack 500 is in the null condition with the bottom surfaces 501 all of segments 502 and segment 400 aligned and the curved nose end 415 of high segment bar 401 is in slot 404 engaging the bottom 503 of slot 404 in segments 502 and the top 504 of slot 404 in segment 400. Schematically shown in FIG. 5a is the condition for FIG. 4c in respect to the shoe plate stack 500 when the outer segment 502 of shoe plate stack 500 first engages the work surface and is raised upon going onto the work surface. The bottom 503 of slot 404 in the outer segment 502, contacting the curved nose end 415 of high segment bar 401 (see FIG. 4) raises the curved nose end 415 as outer segment 502 is raised. As curved nose end 415 is raised, vertically pivoting high segment bar 401, the curved nose end 415 pressing against the top 504 of slot 404 in segment 400 raises segment 400 thus transferring the motion of outer segment 502 to the non-terminal (e.g. center) segment 400 of the shoe plate stack 500.

Figure 6:
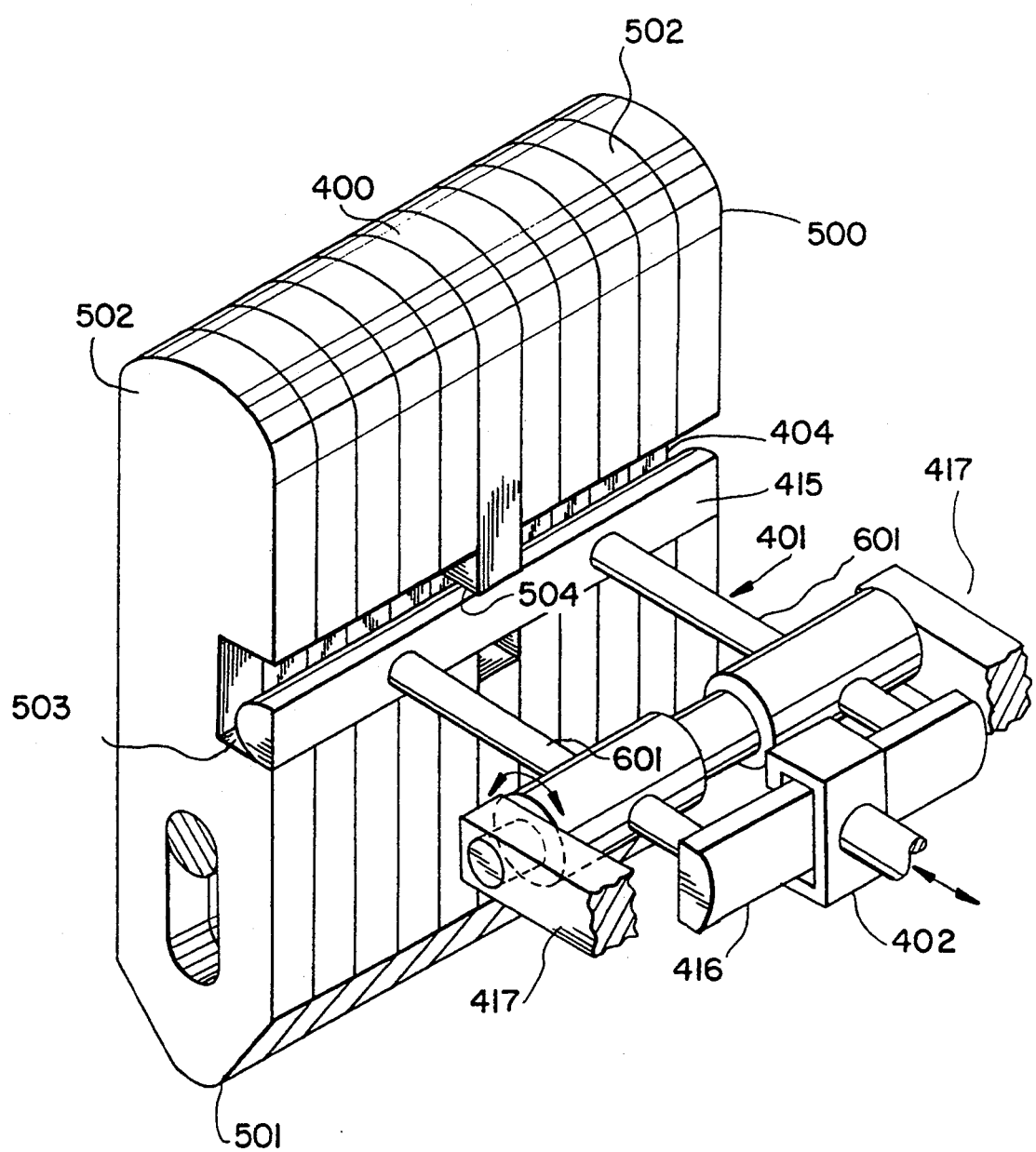
FIG. 6 is a perspective view of the stacked plate segments of a stacked plate segmented shoe with the high segment bar engaging the segments.

In FIG. 6 there is shown a partial perspective view of the shoe plate stack 500 of FIG. 5 and the high segment bar 401, clevis 402 and pivot joint 417 of FIG. 4. The high segment bar 401 is shown in FIG. 6 in the advanced position wherein the curved nose end 415 of high segment bar 401 is in slot 404 of the shoe plate stack 500 and contacts the bottom surface 503 of slot 404 in segments 502 of shoe plate stack 500 while at the same time contacting the top surface 504 of slot 404 in segment 400. Segments 502 and segment 400 of shoe plate stack 500 in FIG. 6 are in the aligned or "null" position with the nose 501 of each segment being aligned. The arrangement shown in FIG. 6 corresponds to the condition represented in FIG. 4b. High segment bar 401 has two rods 601 joining the forward curved nose end 415 and the rear curved end 416. Rods 601 are slidably supported in a pivot 417 so that the curved nose end 415 of high segment bar 401 my be advanced into and retracted from slot 404 and at the same time permit high segment bar 401 to rotate in pivot 417 as the curved nose end 415 moves vertically with the motion of segments 502 and 400. Curved end 416 is supported within clevis 402 with clearance to permit the unrestricted rise and fall of curved end 416 with the pivoting motion of high segment bar 401 while at the same time being engageable by clevis 402 to cause curved nose end 415 to be advanced into and retracted from slot 404 of shoe plate stack 500 when clevis 402 is laterally moved by a fluid cylinder, not shown.

Figure 7:
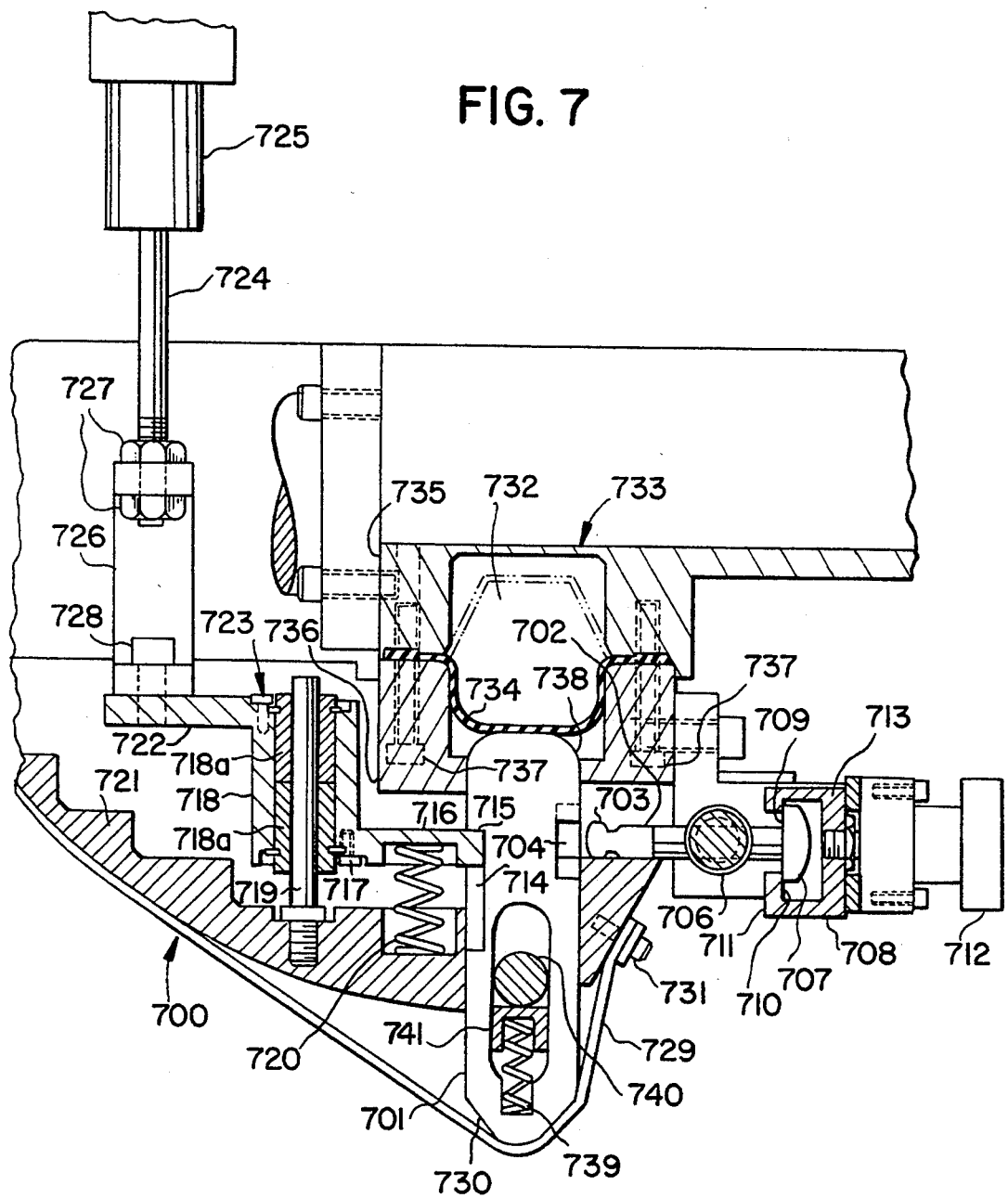
FIG. 7 is a partial side plan view of the improved presser member of this invention with respect to the center segment of the stacked plate segmented shoe presser member.

There is shown in FIG. 7 a partial plan view of a presser member 700 of the improved tape laying machine in accordance with this invention with particular respect to the center shoe segment 701 of the shoe plate stack of the presser member and the improvements pertaining to the high segment bar and LVDT sensor embodiments of this invention. In FIG. 7 the high segment bar 702 is in a retracted position with the curved nose end 703 of high segment bar 702 disengaged from slot 704 in center segment 701. High segment bar 702 is slidably supported in pivot 706 to permit the curved nose end 703 to be moved into engagement with or retracted from engagement with slot 704. The curved rear end 707 of high segment bar 702 is captured in clevis 708 with clearance to permit the rise and fall of curved rear end 707 with the pivoting motion of high segment bar 702. Also shown in FIG. 7 is that curved rear end 707 has a forward face 709 engaged by rear surface 710 of the forward end 711 of clevis 708 for laterally moving high segment bar 702 into a retracted position by fluid cylinder 712 connected to the rear end 713 of clevis 708. The segment 701 has a slot 714 whose upper end 715 is engaged by a bar 716 attached by screw 717 to sleeve 718 slidably supported by bushing 718a on post 719 to follow the vertical movement of segment 701. A spring 720 mounted on housing 721 of presser member 700, engages bar 716 to keep bar 716 in contact with the upper end 715 of slot 714 as segment 701 move vertically. As segment 701, slidable supported in housing 721 of presser member 700, moves vertically bar 716 follows that movement and transmits the movement through arm 722, attached to sleeve 718 by screw 723, to core rod 724 of LVDT 725. Core rod 724 is attached to an adapter 726 by lock nuts 727 and adapter 726 is in turn Joined to arm 722 by machine screw 728. The movement of core rod 724 in LVDT 725 produces an electrical signal in relation to the vertical movement of segment 701. This signal is then used to control the movement of the head and/or the presser member of the tape laying machine in accordance with this invention. The signal may be used directly to operate motors which direct the movement of the head and/or presser member of the tape laying machine or may be processed to operate controlling devices that direct the movement of the head and/or presser member of the tape laying machine (e.g. electrically, hydraulically or pneumatically). A flexible skid member 729 extends under and engages nose 730 of segment 701, as well as all the other segments (not shown) of the shoe plate stack of presser member 700, and is attached at one end to housing 721 of presser member 700 by screw 731. As tape is being laid and compacted, the tape or carrier layer of a carrier-tape assembly is contacted by and held against skid member 729 so that the segments of the shoe plate stack of presser member 700 can apply and compact the tape onto the work surface. Compressed air fed into chamber 732 of bladder spring 733 through an orifice (not shown) presses on flexible membrane 734, held between upper section 735 and lower section 736 of bladder spring 733 joined by screws 737. Flexible membrane 734 in turn presses on the upper end 738 of segment 701, extending into chamber 732, to apply compaction force on the tape, not shown, by nose 730 of segment 701. In a similar manner flexible membrane 734 engages all the segments of the shoe plate stack of presser member 700 to apply compaction force on the tape by all the segments of the shoe plate stack. A spring 739 is provided in slot 741 of center segment 701 that pushes against control rod 740 in slot 741 in center segment 701 and the bottom of slot 741. In FIG. 7 control rod 740 is shown in a position it would occupy when all the segments of the shoe plate stack of presser member 700 are on the work surface and high segment bar 702 has been retracted from slot 704. This position for control rod 740 was achieved, with reference to FIG. 3, by cylinder 304 acting on slider 314 to move the attached control rod arm 330, that is in turn connected to control rod 329 (FIG. 3), 740 (Fig. 7), so as to move control rod 740 to the position shown in FIG. 7 and hold it there. Since control rod 740 is now held in a fixed position in slot 741 of center segment 701 the spring 739 acts against the control rod 740 and the bottom of slot 741 of segment 701 to bias center segment 701 downward with a force that balances the upward force of spring 720 on bar 716 acting against the upper end 715 of slot 714 in segment 701 to bias segment 701 in an upward direction. This balancing of forces on center segment 701 permits segment 701 to apply the same compaction force to the tape as is applied to the tape by each of the other segments of the shoe plate stack of presser member 700.

In conjunction with the practice of this invention there may preferably be employed a tail compaction means such as for example taught in U.S. Pat. No. 4,557,783, assigned to Cincinnati Milacron Inc., the entire disclosure of which is incorporated herein by references.

In the practice of this invention the plastic tape may be of a thermosetting (e.g. epoxy) or thermoplastic (e.g. polyolefin, nylon etc.) and may contain reinforcement such as for example glass or carbon fibers in continuous strand or woven form. The plastic tape may have a carrier film or backing, which may be paper or other suitable material, for transporting the tape.

This invention has been described with reference to a preferred practice thereof. Those skilled in the pertinent art can recognize and practice variations on the invention without departing from the intent, spirit and scope of this disclosed and claimed invention.

What is claimed is:

1. In an improved machine for laying plastic tape on a work surface to produce a plastic article comprising:
 a base structure located in a predetermined tape laying position relative to the work surface;
 a tape laying head means movably mounted on the base structure for applying the tape to the work surface, said head means comprising:
 a frame; and
 a presser member means affixable to said frame; said presser member means comprising:
 a presser member housing affixable to the frame; means for affixing the housing to the frame;
 a plurality of plate segments having flat parallel opposite faces stacked in adjacent face to face array and movably supported in the housing, said segments having a common tape presser face extending from said housing and said segments each also having a biasing portion extending into said housing;
 means for independently guiding said segments in parallel movement with respect to the housing;
 bladder spring means in said housing for yieldably biasing said segments away from the housing including a fluid chamber and a flexible membrane enclosing said chamber and extending into contact with the biasing portion of the plate segments;
 means for controlling the movement of said head; and
 a non-transportable flexible skid member interposed between the tape presser face of said segments and the tape and immovably fixed at one end;
wherein the improvement comprises:
 a means for transmitting vertical movement of any segment of said plurality of plate segments to a preselected non-terminal segment of said plurality of segments to produce vertical movement of said non-terminal segment, and means for detecting vertical movement of said non-terminal segment and producing a signal in relation to said movement.

2. The improved machine according to claim 1 wherein the means for transmitting comprises a high segment bar means movably engagable with and retractable from a compatible recess in each of the segments.

3. The machine according to claim 2 wherein the plurality of plate segments has a high segment bar engagable recess in each of the segments, said recess having an upper and a lower end, such that the upper end of the recess in a single non-terminal segment engages the high segment bar at substantially the same time the lower end of the recess in at least one other segment of the plurality of plate segments engages the bar.

4. A machine according to claim 2 wherein the means for detecting is a linear variable differential transformer.

5. A machine according to claim 3 wherein the means for detecting is a linear variable differential transformer.

6. A machine according the claim 3 wherein the single non-terminal segment is the center segment of the plurality of plate segments.

7. A machine according to claim 5 wherein the single non-terminal segment is the center segment of the plurality of plate segments.

8. The machine according to claim 7 further including a tail compaction means.

9. An improved method of laying plastic tape onto a work surface using a presser member having a plurality of plate segments with flat parallel faces stacked in face to face array, the improvement comprising the steps of:

bringing the presser member into initial engagement with the work surface;

transmitting vertical movement of the segment making initial contact with the work surface to a preselected non-terminal segment of the plurality of segments of the presser member to produce vertical movement of the non-terminal segment;

detecting the vertical movement of the non-terminal segment;

generating a signal in response to the movement of the non-terminal segment; and processing said signal to means for controlling and directing movement of the presser member onto the work surface.

* * * * *